C. LAU.
HORSE GAG.
APPLICATION FILED MAY 11, 1909.
982,075.
Patented Jan. 17, 1911.
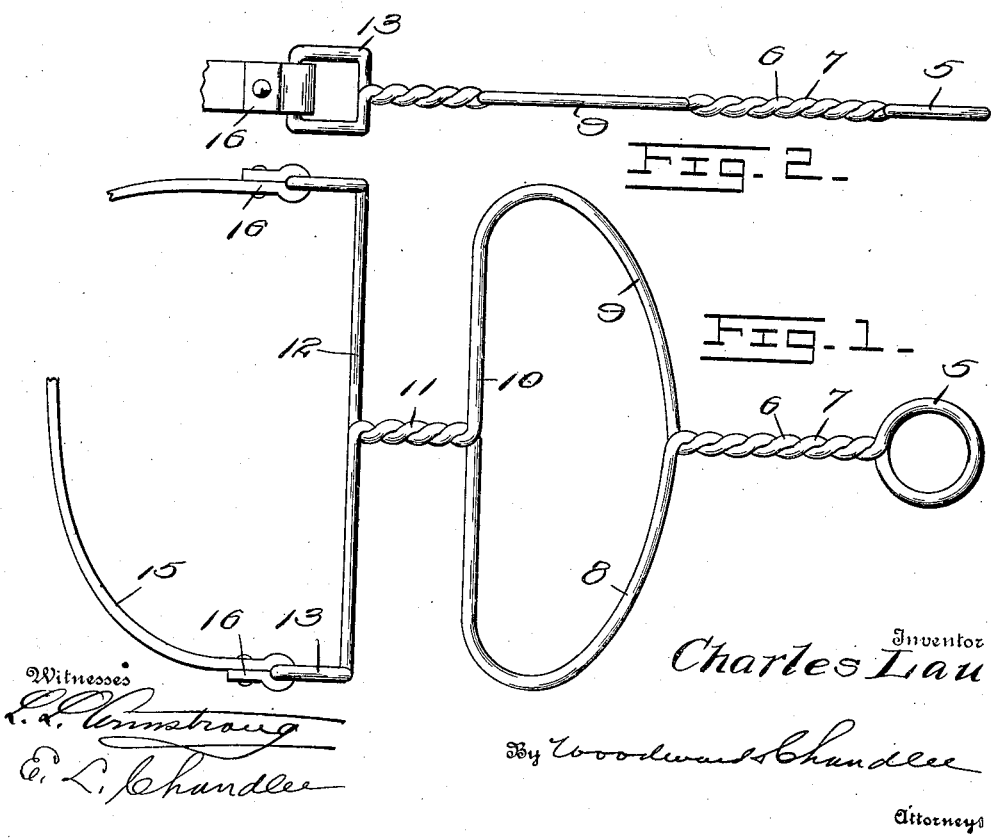

UNITED STATES PATENT OFFICE.

CHARLES LAU, OF OAKLAWN, ILLINOIS.

HORSE-GAG.

982,075.      Specification of Letters Patent.      Patented Jan. 17, 1911.

Application filed May 11, 1909. Serial No. 495,241.

*To all whom it may concern:*

Be it known that I, CHARLES LAU, a citizen of the United States, residing at Oaklawn, in the county of Cook and State of Illinois, have invented certain new and useful Improvements in Horse-Gags, of which the following is a specification.

This invention relates to certain new and useful improvements in horse gags.

The object of this invention is to provide a light, inexpensive and simply constructed horse gag, arranged to be placed in the mouth of a horse or similar animal to be so adjusted as to result in the animal being compelled to open its jaws.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 shows a front view of a one-piece horse gag embodying my invention, Fig. 2 is an edge view thereof.

In dosing horses with medicine, as well as when the teeth of the animal require filling, filing or the like, it is quite necessary to hold the animal's jaws apart in a firm condition.

The aim of my invention is to provide a light, inexpensive horse gag adapted to be used for veterinary or other purposes.

In carrying out the object of my invention, I bend a piece of wire of suitable thickness midlength to form a terminal loop 5 as shown in Fig. 1. From this loop the two wire stems 6 and 7 are continued in the two-strand twisted handle-portion from which the two wire sections are bowed outward in opposite directions to form a lower loop, as shown at 8 and 9 the two members then being directed toward one another in two straight portions to form a tongue bar 10, from which extends the centrally positioned extending stem portion 11. The members are then again bent in opposite directions and parallel to said bar 10 to form the straight roof bar 12, each bar portion terminating in a cheek loop 13 at right angles to the roof bar. The cheek loops serve a double purpose as a tie strap 15 is secured to one of the loops while the other carries a buckle strap 16 so that when in position, the gag may be securely strapped to the animal's upper jaw.

In operation, the instrument is forced between the animal's jaws so that the roof bar 12 rests well within the animal's mouth. The handle is then carried downward so that the lower bar 10 engages the tongue, while the roof bar will engage the upper teeth. In the operation of the instrument the animal is compelled to open its mouth, and as long as the handle extends at right angles to the lower jaw of the animal the jaws are forced apart.

When dental operations are necessary, the tie strap is brought into play so that the instrument is firmly secured to the animal's jaw. As the stem portion 11 is in the center of the animal's mouth, the animal can be conveniently dosed while the teeth can also be easily gotten at.

Having thus described my said invention, what I claim as new and desire to secure by United States Letters Patent is:

A horse gag made of a single piece of wire bent midlength to form a terminal loop continued in a twisted handle portion ending in a jaw conforming loop having a straight tongue bar from which is continued a twisted stem portion ending in a roof bar, said roof bar terminating in two oppositely disposed loops which are substantially arranged on a parallel line with the stem portion, said loops being adapted for coöperation with the opposite sides of the animal's mouth and further providing means for the proper attachment of a suitable strap, as and for the purpose described.

In testimony whereof I affix my signature, in presence of two witnesses.

CHARLES LAU.

Witnesses:
     FRANK VORDA,
     ALBIE KLENHA.